United States Patent [19]
Jarosz et al.

[11] Patent Number: 5,304,408
[45] Date of Patent: Apr. 19, 1994

[54] FIRE BARRIER INSULATION

[75] Inventors: Gregory J. Jarosz, Downers Grove; Kevin J. Hawks, Carpentersville, both of Ill.

[73] Assignee: Transco Inc., Chicago, Ill.

[21] Appl. No.: 931,215

[22] Filed: Aug. 17, 1992

[51] Int. Cl.⁵ .................................. B32B 1/04
[52] U.S. Cl. .......................... 428/75; 428/76; 428/102; 428/182; 428/192; 428/215; 428/256; 428/285; 428/913; 428/920
[58] Field of Search ............ 428/174, 76, 68, 75, 428/182, 192, 102, 913, 137, 213, 215, 256, 285, 300, 920

[56] References Cited
U.S. PATENT DOCUMENTS

| 4,754,514 | 7/1988 | Limb | 428/76 |
| 5,032,447 | 7/1991 | Bailey | 428/184 |

Primary Examiner—Donald J. Loney
Attorney, Agent, or Firm—Wallenstein, Wagner & Hattis

[57] ABSTRACT

The present invention generally relates to a fire barrier insulation blanket (5) having a first sheet of insulation material (10) and a second sheet of thermal reflective material (20) joined together to form a fire and thermal barrier (50). The barrier (50) is encapsulated by two wire mesh sheets (30,40). One mesh sheet (40) is corrugated to space the barrier (50) from the surface being insulated (100). The insulation (5) is stitched together along longitudinal edges (5a,5b) by a stainless steel thread (60). Two blankets (7,8) can be joined together along longitudinal ends (7a,7b,8a,8b) by hog rings (65).

18 Claims, 2 Drawing Sheets

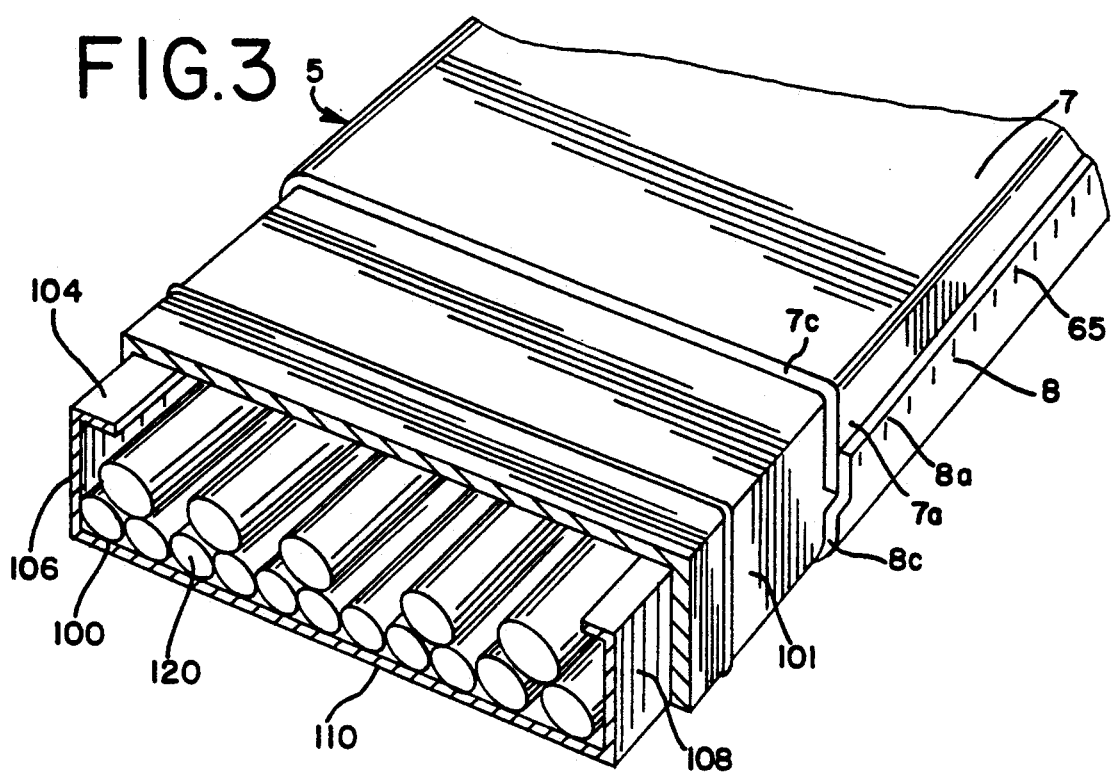
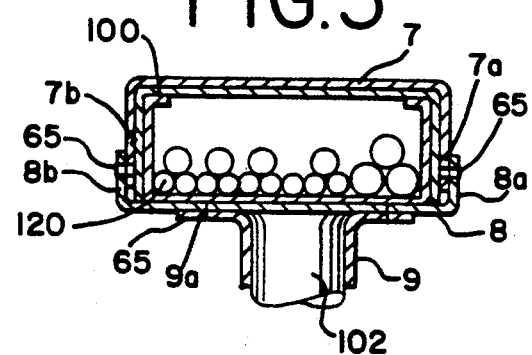
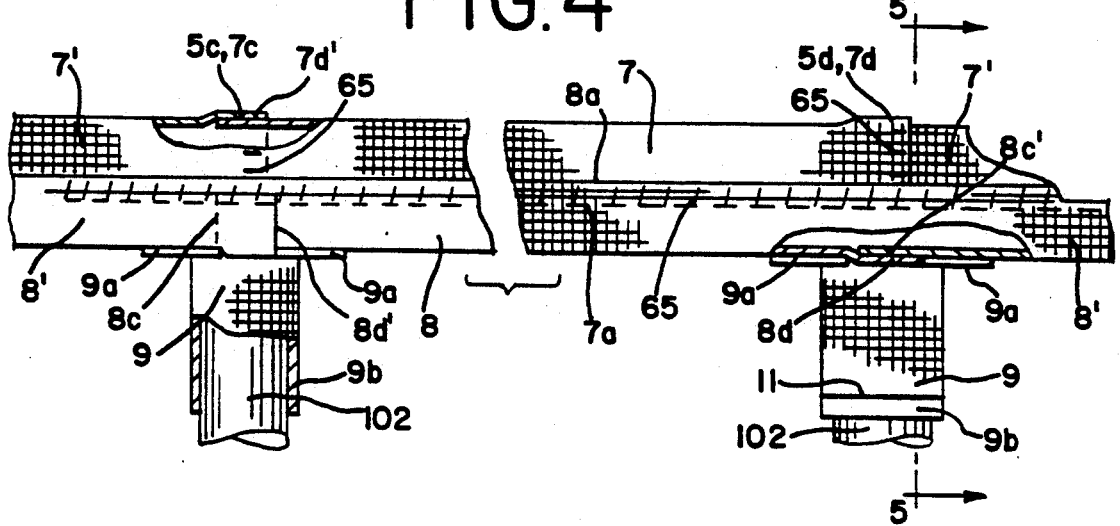

FIRE BARRIER INSULATION

TECHNICAL FIELD

The present invention generally relates to an insulation composition, and more particularly to a fire and heat barrier for, among other things, nuclear power station cable trays, electrical conduit, junction boxes, pull boxes and fire walls.

BACKGROUND PRIOR ART

The importance of heat and fire barriers for insulating from heat and for inhibiting and controlling the spread of fire in public and commercial buildings is widely known. Yet, the importance of these heat and fire barriers takes on even greater proportions when a nuclear power station is concerned. A control room operator must be able to safely and remotely shut down the reactor at all times.

Valves and equipment essential for shutting down the reactor are typically hooked up to a control room instrument panel via electric cables. These cables are supported and routed to the control room through electrical conduit, pull boxes, junction boxes, cable trays, etc., held by supports. These structures are insulated to protect the cables from excess heat and fire.

Cable tray insulation is typically applied around the outside of the cable tray and can take the form of a flexible blanket or rigid board. These flexible blankets or boards are composed of specific insulation materials and have a specific thickness. These flexible blankets and boards are typically pieced together, side by side, to surround the entire length of the cable tray, abutting blanket edges being caulked to prevent fire and heat from contacting or entering the cable tray. Typical fire protection insulations are rated for one or three hours and tested to ensure their performance.

Today, a variety of insulations exist for covering the electrical conduit, pull boxes, junction boxes and cable tray support structure. However, for added protection against heat and fire, there has grown a desire to supplement the existing installations. In particular, there is presently a need to retrofit existing insulation installations to further protect the structures just identified.

A problem with such an insulation is that the insulation should be capable of being installed over existing insulation because the cost of removing this existing insulation is oftentimes expensive. Such insulation must also be relatively flexible for conforming to the shape of the support structure and to various existing component configurations. The insulation must also be durable enough to withstand required tests and handling.

In addition, the insulation must provide a fire shield to prevent unwanted deterioration of the insulation. The insulation must also be capable of withstanding the forces produced by a pressurized stream of water generated by fire fighting equipment and, the insulation must be relatively thin to accommodate the tight clearances that often arise in power plant construction. For example, conduit and cable trays are often routed very close to other pipes, valves and equipment. Thus, an additional layer of insulation must be relatively thin to avoid the expense of rerouting the obstructing pre-existing equipment.

The present invention is provided to solve these and other problems and to overcome the obstacles just described.

SUMMARY OF THE INVENTION

The present invention generally relates to an insulation blanket having a first sheet of insulation material and an attached sheet of thermal reflective material that together form a fire and thermal barrier. The fire and thermal barrier is encapsulated by two wire mesh sheets. One mesh sheet is corrugated to space the barrier from the surface being insulated, providing an additional air space/layer of insulation. The insulation is stitched together adjacent its longitudinal edges by a stainless steel thread and hog ringed together along its front and rear ends. The sheet of insulation material is preferably Alumina-Silica. The sheet of thermally reflective material is preferably a stainless steel foil. The wire mesh sheets are preferably made of Stainless Steel 304 and formed by knitted interlocking loops that provide two-way stretch, i.e., movement in the lateral and longitudinal directions.

One advantage of the present invention is that it can be applied over an existing blanket of insulation. The existing blanket need not be removed, thereby eliminating removal and disposal costs for the existing insulation. In addition, by utilizing the existing insulation, less insulative material is needed to achieve a particular insulative value, thereby reducing material, shipping and installation costs.

An additional advantage of the present invention is that when installed over an existing insulation, the combination of both insulation blankets meets the fire protection testing requirements for United States nuclear power plant applications, and in particular, the support structure used for routing cable in those nuclear power plants.

A still further advantage of the present invention is that it acts as a fire shield to protect installations from direct exposure to the flames of a fire.

A yet further advantage of the present invention is that it maintains its integrity when exposed to the forces generated by water hose pressure of fire fighting equipment. The insulation is also thin so as to accommodate the tight clearances found in power plants. And, it provides a self contained means for spacing its own insulation barrier from the surface being insulated. It is also flexible for conforming to the shape of the surface being insulated while remaining durable enough for handling and power plant applications.

Other features and advantages of the invention will be apparent from the following specification taken in conjunction with the following drawing.

BRIEF DESCRIPTION OF DRAWINGS

In order that the present invention may be more fully understood, it will now be described by way of example, with reference to the accompanying drawings in which:

FIG. 3 is a perspective view of the fire barrier insulation of FIGS. 1 and 2 installed around a cable tray already covered by insulation:

FIG. 4 is a side elevation view of the fire barrier insulation installed around a cable tray and its supports; and, FIG. 5 is a sectional view taken along line 4—4 of FIG. 4.

DETAILED DESCRIPTION

Figure 1:
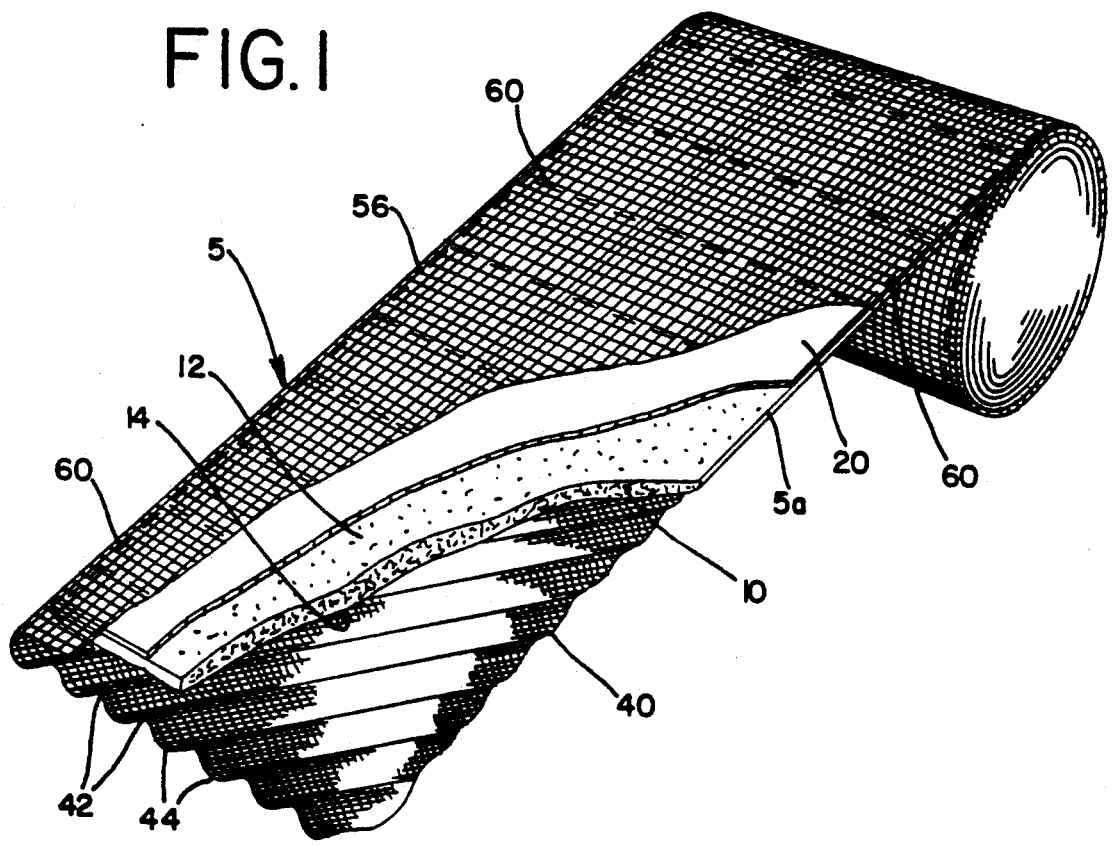
FIG. 1 is a perspective, cut-away view of a roll of the fire barrier insulation of the present invention.

While this invention is susceptible of embodiments in many different forms, there is shown in the drawings and will herein be described in detail, a preferred embodiment of the invention with the understanding that the present disclosure is to be considered as an exemplification of the principles of the invention and is not intended to limit the broad aspects of the invention to the embodiment illustrated.

Figure 2:
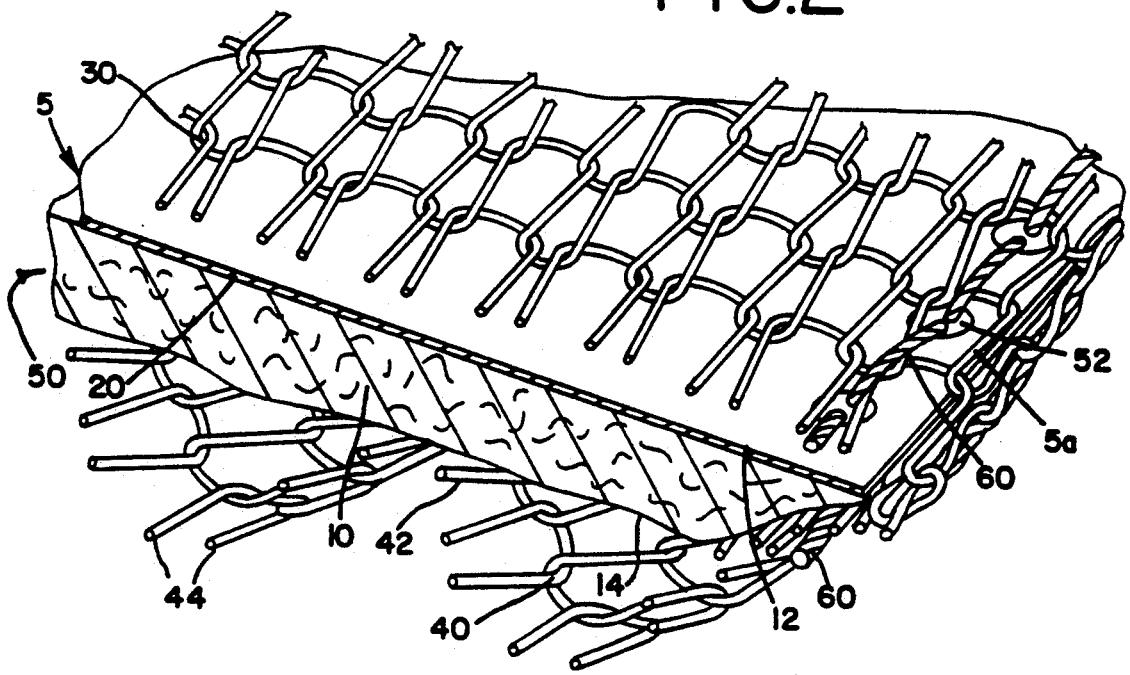
FIG. 2 is an enlarged, perspective, sectional view of the fire barrier insulation of FIG. 1.

Shown in FIGS. 1 and 2, the present invention relates to a flexible blanket of insulation to guard and protect against fire and heat, designated generally by reference number 5. The blanket 5 comprises a first layer of thermally non-conductive insulation 10, a second layer of a thermally reflective sheet 20, both being encapsulated by first and second sheets of knitted mesh 30,40, and is held together by thread 60 adjacent its longitudinal edges 5a,5b. The blanket 5 is preferably made in roll form for ease of manufacturing, shipping and handling.

The thermally non-conductive layer 10 is relatively flexible and has both upper and lower surfaces 12,14. This non-conductive layer 10 is preferably an Alumina-Silica material having a melting point of about 3200° F. The material is also preferably composed of about 47% Alumina and about 53% Silica by weight, has a density of about 12 lbs/cuft and has a thermal conductivity of about 0.5 to 2.0 Btu-in/hr-sqft-F from 200° to 2000° F., respectively. Such material has been found to maintain its strength after numerous tests reaching 2000° F. This material can also be bent or shaped without cracking and has good handlability characteristics. Layer 10 is preferably ⅛ to ¼ inch thick, but can be thicker to improve the thermal resistance of the blanket 5. A non-conductive layer 10 of Alumina-Silica meeting these design parameters is supplied by Thermal Ceramics of Augusta, Ga. and is sold under the trademark ULTRAFELT® PAPER. However, it should be understood that other inorganic materials that maintain the above characteristics when exposed to radiation are also acceptable.

The second layer, namely the thermally reflective sheet 20, covers the upper surface 12 of the first non-conductive layer 10. The reflective sheet 20 is preferably a flexible sheet of stainless steel foil having a thickness of about 2 millimeters. The combination of the Alumina-Silica layer 10 and the stainless steel sheet 20 form a thermal barrier 50 (see FIG. 2).

The first and second knitted mesh 30,40 encapsulate the thermal barrier 50 and are placed on one side against the foil sheet 20 and on the other side against the lower surface 14 of the non-conductive layer 10, respectively. The knitted wire mesh 30,40 have an interlocking loop structure. This interlocking loop structure is knitted in very much the same way as a stocking or sweater and allows for at least a two-way stretch such that the loops can move relative to each other in both the longitudinal and the lateral directions.

Both knitted mesh 30,40 are preferably made of stainless steel wire, such as 304 Stainless Steel having a diameter of about 0.008 to 0.011 inches. Both the knitted mesh 30,40 also preferably have a density of about 48 loops per square inch and tolerance of temperatures up to about 1200° F. Knitted wire mesh meeting these design criteria are supplied by Advanced Thermal Corp. of Bensenville, Ill.

The second knitted mesh 40, the one adjacent the non-conductive layer 10, is preferably corrugated to have both peaks 42 and troughs 44 (see FIG. 1). This corrugated structure spaces the Alumina-Silica layer 10 from the surface being insulated. The upper-most points of the peaks 42 form a first surface that abuts the lower surface 14 of the non-conductive layer 10. The bottom-most points of the troughs form a second surface that abuts the surface being insulated. This spaced relationship creates an air pocket (not shown) between the barrier 50 and the surface being insulated which improves the insulating characteristics.

In practice, the knitted mesh 30,40 are preferably joined together at the edges of barrier 50. The first knitted mesh 30 is sized to extend over the edges of the barrier 50 and is folded around these edges and compressed to lay flat against the second, corrugated mesh 40. This folded structure protects the edges of barrier 50 and helps hold the blanket 5 together. Consequently, the joined first and second mesh 30,40 totally encapsulate the barrier 50 formed by the joined non-conductive layer 10 and reflective sheet 20.

A thread 60 is used to hold the non-conductive layer 10, the reflective sheet 20, and the mesh 30,40 together adjacent the longitudinal edges 5a,5b of the blanket 5. The thread 60 is stitched through each of these materials and prevents the non-conductive layer 10 and the reflective sheet 20 from separating or moving relative to one another. The thread 60 is stitched through the barrier 50 and each of the wire mesh 30,40, about two inches from the longitudinal edges 5a,5b. The thread is looped around at least one wire of each of the mesh 30,40. The thread 60 creates holes 52 in the barrier 50. These holes 52 should be small in diameter, as close as possible to the diameter of the thread 60.

The blanket 5 can also be quilted. This quilting is achieved by stitching thread 60 from one longitudinal edge 5a of the blanket 5 to the other longitudinal edge 5b, at intervals of eight inches starting from the front, leading edge 5c of the blanket 5 to the rear edge 5d of the blanket (see FIG. 4). This quilting helps prevent the barrier 50 from becoming uneven or shifting.

The thread 60 is preferably a three-ply, stainless steel sewing thread having a monofilament core and a cotton covering. The thread 60 is about 0.5 millimeters in diameter and capable of withstanding temperatures of about 2100° F. A thread meeting the above specifications is also available from Advanced Thermal Corp. of Bensenville, Ill. Although a thread 60 is shown and described for holding the blanket 5 together, it is appreciated that other fastening means, such as stainless steel staples and hog rings, may be substituted for the thread 60.

FIGS. 3-4 show the blanket of insulation 5 applied around a cable tray 100. The cable tray 100 is supported by supports 102 and can contain several electrical cables 120. The cable tray 100 and supports 102 may have already been wrapped by an existing blanket of thermal insulation, i.e., the insulation designated by reference number 101. While the thermal insulation 5 is shown to be applied to a cable tray 100 wrapped with an existing insulating blanket 101, it should be noted that the insulation 5 can also be applied directly to a cable tray 100 or any other surface.

In practice, installation of the fire barrier insulation 5 to a cable tray is as follows. A first insulation blanket 7 is preferably cut to fit between the cable tray supports 102. This first insulation blanket 7 is then positioned onto the top 104 of the cable tray 100 so that the corrugated knitted mesh 40 contacts the cable tray 100. This first blanket 7 is then folded around the sides 106 and 108 of the cable tray 100.

A second insulation blanket 8 is next cut to fit between the supports 102 and positioned against the bottom 110 of the cable tray 100. Again, the corrugated knitted mesh 40 contacts the cable tray 100. The second blanket 8 is folded around the sides 106,108 of the cable tray 100 so as to overlap the first blanket 7 by about two inches on each side. This overlap helps prevent flames and heat from passing between the two blankets. About two inches overlap also helps ensure that thread holes 52 are covered by the other blanket.

As shown in FIG. 4, the first blanket 7 and the second blanket 8 are cut to span between the cable tray support 102. Longitudinal edges 7a,7b,8a,8b of the two blankets 7,8 are joined together by a plurality of hog rings 65. Hog rings 65 are generally spaced at intervals of less than one inch apart and crimped closed to securely join the blankets 7,8 together. If the blankets 7,8 are too wide for a given cable tray 100, a strip can be cut from one of the longitudinal edges 7a,8a of each blanket 7,8. The barrier 50 is thus held securely against the newly formed longitudinal edge 7a by hog rings 65 and/or staples.

The above installation process is repeated by installing an adjacent set of first and second blankets 7',8'. The second set of blankets 7',8' overlap the first set of blankets 7,8, by about two inches, to again ensure that flames and excess heat do not pass between the adjacent blankets. The adjacent first blankets 7,7' and adjacent second blankets 8,8' are joined by hog rings 65 in the same manner as discussed above. Longitudinal edges 7c,7d of the first blanket 7 are joined to the lateral ends 7c',7d' of its adjacent blankets 7'. Similarly, lateral edges 8c,8d of the second blanket 8 are joined to the lateral ends 8c',8d' of its adjacent blankets 8'. The lateral edges 8c,8d,8c',8d' of the second blankets 8,8' are notched to accommodate supports 102.

The cable tray supports 102 contact cable tray 100 and can therefore form a heat sink and conduct heat into the cable tray. For this reason supports 102 are wrapped with a third piece of insulation blanket 9, as shown in FIGS. 4 and 5. The third blanket 9 covers the support 102 sufficient to ensure that heat absorbed by the support will not be conducted into the cable tray 100. One end 9a of the third blanket 9 is positioned so as to overlap the two second blankets 8,8' by about two inches. This end 9a is secured to the second blankets 8,8' by use of hog rings in the same manner discussed above. Another end 9b of the blanket 9 is secured to the support 102 by a belt 11 which is strapped around the blanket 9 and tightened.

Although installation of the fire barrier insulation 5 has been shown and described for a cable tray 100, it is appreciated that some insulation 5 can be applied to a variety of surfaces, such as electrical conduit, junction boxes, pull boxes, control panels and any othr electrical, mechanical and/or structural devices, and their supports, or a fire wall and/or floor, without deviating from the invention.

It will also be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. An insulation blanket comprising:
   a flexible and continuous aluminum-silica layer having upper and lower surfaces;
   a flexible thermal reflective sheet covering and attached to said upper surface of said aluminum-silica layer, said aluminum-silica layer and said thermal reflective sheet forming a thermal barrier; and,
   a flexible knitted wire mesh having interlocking loops surrounding said barrier and holding said barrier together, said wire mesh having first and second wire mesh sheets, said first wire mesh sheet covering said thermal reflective sheet and said second wire mesh sheet covering said lower surface of said aluminum-silica layer, both said wire mesh sheets being joined to one another.

2. The insulation blanket of claim 1, wherein said second wire mesh is corrugated to space said barrier from the surface being insulated.

3. The insulation blanket of claim 1, wherein said knitted wire mesh is 304 Stainless Steel having a density of approximately 48 openings per square inch.

4. The insulation blanket of claim 1, wherein said thermal reflective sheet is a stainless steel foil.

5. The insulation blanket of claim 4, wherein said stainless steel foil is about 2 millimeters thick.

6. The insulation blanket of claim 1, wherein said aluminum-silica layer is about ⅛ to ¼ inch thick.

7. The insulation blanket of claim 1, wherein said barrier has longitudinal edges and said longitudinal edges and said flexible mesh are stitched together by thread.

8. The insulation blanket of claim 7, wherein said thread is a monofilament core high temperature stainless steel thread.

9. 11. An insulation blanket comprising:
   a flexible first sheet of insulation material;
   a flexible second sheet of thermal reflective material attached to and covering one side of said first sheet; and,
   a flexible third sheet of knitted wire mesh encapsulating said first two sheets
   and providing means for spacing said first sheet from a surface being insulated.

10. The insulation blanket of claim 9, wherein said means for spacing-said first sheet from the surface being insulated is said third sheet, said third sheet being configured so as to have a first surface abutting said first sheet and a spaced second surface spaced from said surface abutting said surface being insulated.

11. The insulation blanket of claim 10, wherein said third sheet is a corrugated wire mesh, the corrugation peaks forming said first surface and the corrugation troughs forming said second surface.

12. An insulation blanket comprising:
   a flexible and continuous aluminum-silica layer having upper and lower surfaces;
   a flexible thermal reflective sheet covering and attached to said upper surface of said aluminum-silica layer, said aluminum-silica layer and said thermal reflective sheet forming a thermal barrier having longitudinal and lateral ends;
   a flexible first knitted wire mesh generally covering said thermal reflective sheet;
   a flexible second knitted wire mesh generally covering said lower surface of said aluminum-silica layer and being corrugated to space said barrier from the surface being insulated, said first and second wire mesh encapsulating said barrier and being joined together at said longitudinal ends of said barrier; and, thread joining said longitudinal ends of said barrier and said first mesh and second mesh together.

13. The insulation blanket of claim 12, wherein said barrier and mesh have front and rear ends and two side edges and said barrier and flexible mesh are stitched together from longitudinal edge to longitudinal edge at spaced intervals from said front end to said rear end.

14. The insulation blanket of claim 12, wherein said knitted wire mesh is 304 Stainless Steel having a density of approximately 48 openings per square inch.

15. The insulation blanket of claim 12, wherein said thermal reflective sheet is a stainless steel foil.

16. The insulation blanket of claim 13, wherein said stainless steel foil is about 2 millimeters thick.

17. The insulation blanket of claim 13, wherein said thread is a monofilament core high temperature stainless steel thread.

18. The insulation blanket of claim 13, wherein said aluminum-silica layer is about ⅛ to ¼ inch thick.

* * * * *